US008868558B2

(12) United States Patent
Blanco et al.

(10) Patent No.: US 8,868,558 B2
(45) Date of Patent: Oct. 21, 2014

(54) QUOTE-BASED SEARCH

(75) Inventors: Roi Blanco, Barcelona (ES); Michael Patrick Matthews, Barcelona (ES); Peter Mika, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 211 days.

(21) Appl. No.: 13/330,087

(22) Filed: Dec. 19, 2011

(65) Prior Publication Data

US 2013/0159340 A1 Jun. 20, 2013

(51) Int. Cl.
*G06F 7/00* (2006.01)

(52) U.S. Cl.
USPC .......................................................... 707/736

(58) Field of Classification Search
USPC ................................................. 707/736, 738
See application file for complete search history.

(56) References Cited

U.S. PATENT DOCUMENTS

| | | | | |
|---|---|---|---|---|
| 6,442,546 | B1 * | 8/2002 | Biliris et al. ........................... | 1/1 |
| 7,907,755 | B1 * | 3/2011 | Perlmutter et al. ............ | 382/118 |
| 8,132,103 | B1 * | 3/2012 | Chowdhury et al. ......... | 715/723 |
| 2004/0103090 | A1 * | 5/2004 | Dogl et al. ......................... | 707/3 |
| 2007/0136243 | A1 * | 6/2007 | Schorn .............................. | 707/3 |
| 2009/0282019 | A1 * | 11/2009 | Galitsky et al. .................... | 707/5 |
| 2011/0224989 | A1 * | 9/2011 | Johnson ........................ | 704/272 |
| 2011/0282860 | A1 * | 11/2011 | Baarman et al. .............. | 707/709 |
| 2012/0054660 | A1 * | 3/2012 | Marusich et al. ............. | 715/772 |
| 2012/0150907 | A1 * | 6/2012 | Chowdhury et al. ......... | 707/769 |

OTHER PUBLICATIONS

Catizone et al., "Evaluating Automatically Generated Timelines from the Web", University of Sheffield, Computer Science Department, pp. 885-888.

Demartini et al., "Report on INEX 2008", Inex Report.
Alonso et al., "Clustering and Exploring Search Results using Timeline Constructions", pp. 97, CIKM '09, Nov. 2-6, 2009, Hong Kong, China.
Balog et al., "Overview of the TREC 2009 Entity Track", Thijs Westerveld, Teezir, Utrecht, The Netherlands.
Jatowt et al., "Supporting Analysis of Future-related Information in News Archives and the Web", JCDL'09, Jun. 15-19, 2009; Austin, Texas.
Baeza-Yates, "Searching the Future", ACM SIGIR Workshop MF/IR 2005; Mideplan, Chile.
Zaragoza et al., "Ranking Very Many Typed Entities on Wikipedia".
Lenssen, "Google News Quotes Finder", Apr. 18, 2008 http://blogoscoped.com/archive/2008-04-18-n75.html; retrieved Oct. 31, 2011.
Lenssen, "Google Finding Quotes", Sep. 24, 2008 http://blogoscoped.com/archive/2008-09-24-n57.html; retrieved Oct. 31, 2011.
Matthews et al., "Searching through time in the New York Times", HCIR Challenge 2010; New Brunswick, NJ.

* cited by examiner

*Primary Examiner* — Truong Vo
(74) *Attorney, Agent, or Firm* — James J. DeCarlo; Greenberg Traurig, LLP

(57) ABSTRACT

A user search for quotes attributable to people or information regarding the quotes is fulfilled by providing the relevant information from a quote index. The quote index is built from a data store comprising articles that include quotes given by people. Quotes are extracted from the articles along with the relevant attributes such as the keywords, topics and entities. The extracted keywords, topics and entities are indexed with unique identifiers. A quote index is built by storing the quotes along with the keywords, topics and related entities. Quotes or information associated with the quotes based on various criteria is retrieved and presented in different formats.

25 Claims, 14 Drawing Sheets

| Quotes | Quotes About | Quote Date | Quotes Conf | Person | Location | NP |
|---|---|---|---|---|---|---|

Barack Obama (33) *

Kathleen Sebelius (23) *

Michael Ignatieff (17) *

Jack Layton (15) *

Stephen Harper (15) *

Mitt Romney (14) *

Newt Gingrich (14) *

Arvind Subramanian (12) *

Donald Berwick (12) *

Bruce Springsteen (11) *

FIG. 9a

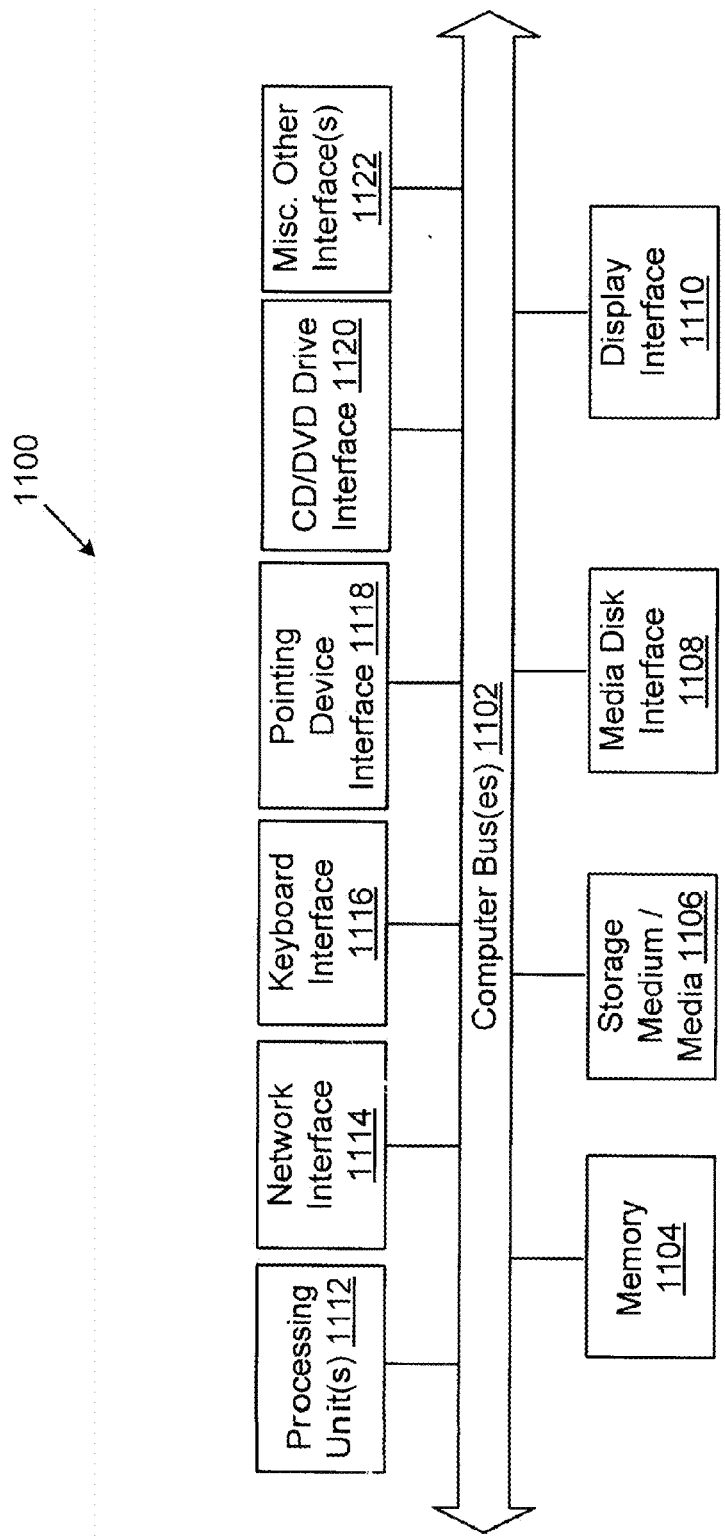

QUOTE-BASED SEARCH

FIELD

The present disclosure relates to searching on the web, and more specifically to finding quotations attributable to people.

BACKGROUND

Online archives include numerous articles like news items, blog posts, opinions and other such material that contain many quotes given by different people distributed across the articles. For example, prominent personalities may put forth statements about topics being debated in public or people may write their opinions or reviews about various issues in newspapers or online blog posts etc. Similarly, original literary works such as novels, poems or plays can also be considered to include quotations made by people authoring them. These quotations are a source of great interest to users who would like to know the thoughts of different people on various issues. Such quotations may also be used for researching personalities or issues by journalists, students or other users.

SUMMARY

This disclosure provides means to automatically extract quotations attributable to people along with associated metadata that allows users to explore the quotes based on various criteria.

In one aspect, a method of providing quotes in response to a user query is disclosed. A user query for quotations given by people is received and at least one keyword comprised within the query is identified. Quotes comprising the at least one keyword and quotes that have the at least one keyword as a respective attribute in a quote index are provided as quotes relevant to the received query. The quote index indexes quotations attributable to people and it includes a unique identifier for each of the attributes of the quotations. The relevant quotes and their respective metadata are retrieved from the quote index via the unique identifiers as being responsive to the user query and transmitted to the user. If any feedback associated with the transmitted quotes is received from the user, the transmitted set can be further refined based on such feedback. In one embodiment, a second entity in the quote index associated with the transmitted quotes is identified from the user feedback. Accordingly, a set of quotes updated based at least on the second entity is transmitted to the user.

In a further aspect, the quotation index is generated from articles that include quotes made by people. The articles are initially processed and parsed to generate discrete sentences and particular sentences that are quotes attributable to people are identified. Keywords included in the sentences identified as quotes are extracted and indexed based on unique identifiers assigned to them. The quote index also stores the unique identifiers, the keywords, respective quotes and respective entities associated with the quotes. The entities associated with the quotes can comprise without limitation, a person who gave the quote, a time at which the quote was made, a location or event associated with the quote, a topic of the quote, a person or place referred to in the quote.

The method also facilitates generating a timeline of the set of quotes, wherein the timeline maps quotes in the set to respective temporal entities. The timeline can also be updated based on further user input.

In another aspect, a computer-readable storage medium tangibly storing thereon computer program instructions capable of being executed by a computer processor is disclosed. The computer program instructions facilitate receiving, by a processor, a user query for quotations given by people. The instructions facilitate the processor to identify at least one keyword comprised within the query. The instructions further cause the processor to access a quote index that indexes quotations attributable to people. The processor retrieves quotes comprising the keyword and quotes that have the keyword as a respective attribute in the quote index as being relevant to the user query and transmits them to the user.

Another method of providing quotes is disclosed in accordance with yet another aspect. The method includes accessing, by a processor, a data store comprising articles that include quotes attributable to people. Sentences in the articles that are quotes attributable to people are identified and the relevant keywords are extracted from the quotes. The extracted keywords are indexed by assigning unique identifiers to each of the keywords. A quote index is built by storing, without limitation, at least the unique ids, the keywords, respective quotes and associated attributes of the respective quotes. Access to the quote index is provided to requesting applications, for transmitting quotes from the quote index that are relevant to the keywords in a received query.

A computing device for retrieving quotes is disclosed in accordance with yet another aspect. The computing device comprises a query input module that receives a user query comprising keywords and a quote search engine that generates results responsive to a user query from a quote index. The quote index comprises indexed quotes attributable to people in addition to unique identifiers for a subset of the received keywords. The quote index also comprises various attributes associated with the quotes. A query analysis module included in the computing device analyzes the user query, extracts the keywords from the user query and accesses the quote search engine for production of the results responsive to the user query. The quote search engine comprises a retrieval module that analyzes the keywords received from the user query to determine attributes associated with quotes that match the user query. The quote search engine also comprises a presentation module that determines a presentation format for the generated results and formats the results for display to a user. The presentation module further comprises a ranking module that ranks the generated results and a timeline module that generates a timeline of quotes associated with the results with respective dates.

A quote index generation engine included in the computing device builds the quote index from a collection of articles. The computing device further comprises a document analysis module that parses documents within the collection and generates tokens, an entity recognition module that identifies the entities from the generated tokens and provides the unique identifiers for each of the entities and a quote extraction module that extracts the quotes from the articles. A quote characterization module also included in the computing device characterizes the quotes as positive, negative or neutral based on sentiments expressed regarding respective topics or entities associated with the quotes in addition to further identifying an intensity of sentiment expressed in the quotes. An indexing module builds the quote index by storing attributes of the quotes, such as, by way of non-limiting example, the entities, keywords, topics and the unique identifiers in the quote index.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 9a is a depiction of an example of a section of the webpage shown in FIG. 8 in accordance with an embodiment of the present disclosure;

FIG. 11 is a block diagram illustrating an internal architecture of a computing device in accordance with an embodiment of the present disclosure.

DESCRIPTION OF EMBODIMENTS

Figure 1:
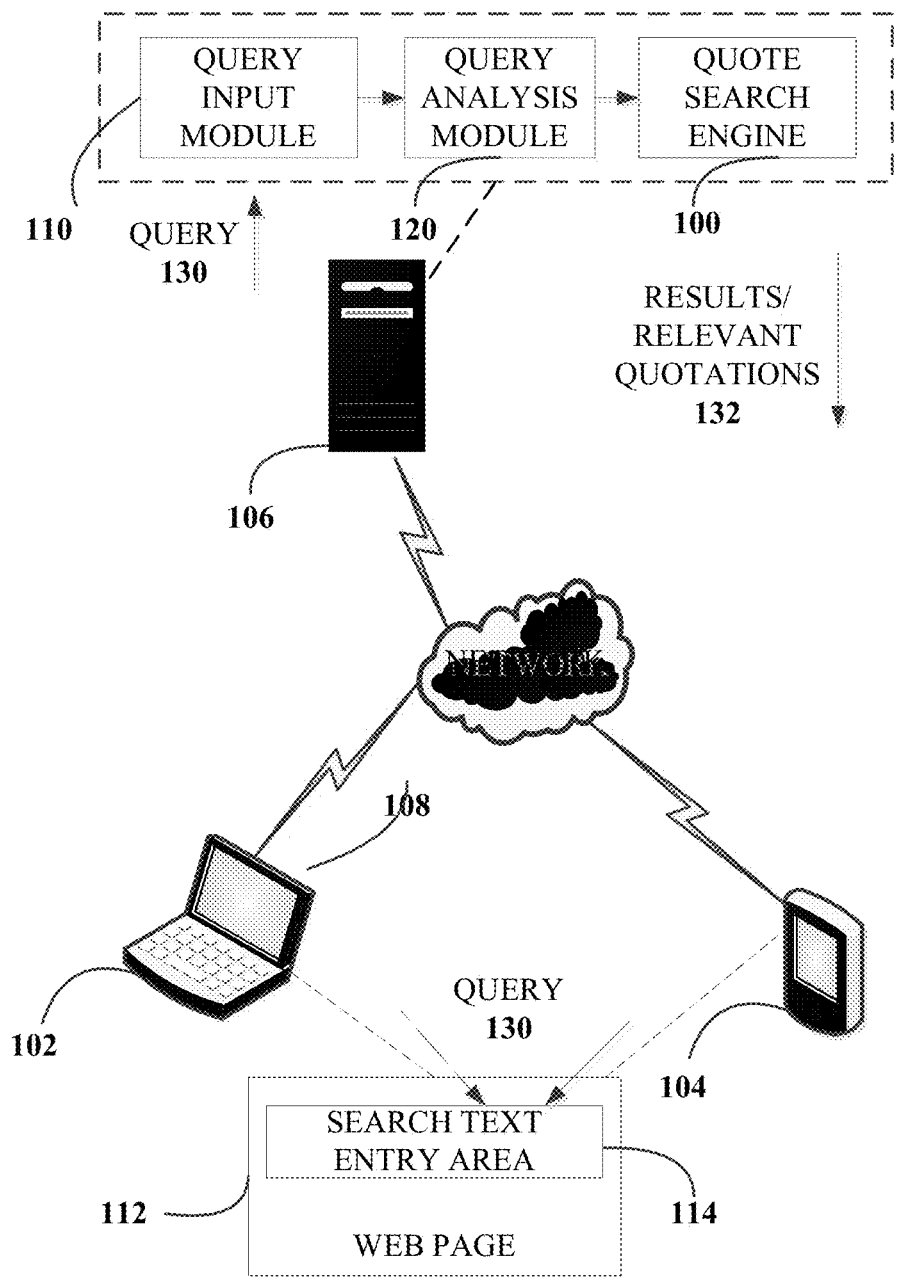
FIG. 1 is a block diagram of a user computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

FIG. 1 is a block diagram of an embodiment wherein a user computer 102 or 104 communicates with a server computer 106 over a network 108 such as the Internet. The computers 102/104 are employed by users to display a web page 112 via a web browser. The web page (e.g., Yahoo!®, Bing®, or Google®) includes a search query entry area 114 where a user can enter a search query 130 (e.g., one or more words). Users may search for any type of information such as news articles, videos, audio content etc. Various embodiments described herein address the users' need to find information related to quotations attributable to people.

The user computer(s) 102/104 transmits information entered by the user such as the search query 130 to the server computer 106. A query input module 110 on the server computer 106 receives the query 130 and transmits it to the query analysis module 120. Upon analysis by the query analysis module 120, results relevant to the received query 130 are retrieved from a quote search engine 100. A result set 132 is generated and returned to the user computer(s) 102/104.

The query analysis module 120 parses the query 130 to retrieve the keywords included in the query 130 and to determine user intent. Various keywords can be received in a user query such as without limitation, entities like people or locations, specific topics such as economy or arts, dates or other parts of speech like prepositions e.g., about, by etc. The user intent can be determined by query analysis module 120 from the received query 130 in a single step or in a series of steps. In one embodiment the query analysis module 120 determines, upon initially receiving the user query 130, that the user desires to retrieve quotations or information related to quotations associated with the keywords in the query 130. Accordingly, the query analysis module 120 directly accesses the quote search engine 100 to retrieve relevant results 132 for presentation to the user. In different aspects, the results 132 can include quotations attributable to people or organizations or information regarding quotations attributable to people or combinations thereof. By the way of illustration and not limitation, the information regarding quotes that a user can query for includes the number of quotations issued by people on different topics, the time of issuing the quotes, the people or the organizations giving the quotes, the topics on which people issue quotes, the events or sources of quotes, the sentiments and the intensity of the sentiments expressed in the quotes, or other characteristics related to the quotes.

In another embodiment, the procedure of determining user intent includes a series of steps carried out by the query analysis module 120. For example, if the user query 130 includes the name of a person, the query analysis module 120 can initially access various resources (not shown) in addition to the quote search engine 100 to present a mixed result set to the user. The mixed result set can comprise results such as quotations about or by the person, articles about or by the person that can include quotations, or other items such as video or audio items associated with the person that are available on the Internet. Based on the user selection of, for example, a quotation made by the person, the query analysis module 120 can further determine with greater accuracy that the user desires to obtain quotations associated with the person. Therefore, based on the user selection, a second query can be formulated by the query analysis module 120 itself and passed on to the quote search engine 100. Thus, the result set initially transmitted to the user can be further refined with the specific person or a specific topic or combinations thereof related to which the user desires to obtain quotations. Accordingly, the quote search engine 100 retrieves the relevant results from a quote index as will be detailed further infra, and transmits the refined result set for display on the user computer(s) 102/104.

The results in the result set can be presented in various formats based on criteria determined for the user query or other default parameters defined in the quote search engine 100. The result set can comprise a list of quotations ranked according to their relevance to the user query in addition to other criteria specified by the user. For example, if the user searches for quotations relevant to a given topic, the quotations can be ranked such that quotes made a person who is most relevant to the topic appear first in the results. Alternately, the user may include temporal criteria along with the topic. In this case, the quotations may be ranked in ascending or descending order of the dates associated with them. Thus, various criteria combined in the query 130 can be derived and the results can be presented accordingly.

In another aspect, the quotations included in the result set can also be ranked by the sentiments associated therewith. For example, a quotation may express a positive sentiment wherein the person giving the quotation is disposed favorably towards the issues about which the quote is given or the quotation can express a negative sentiment which indicates that the person making the quotation is disposed negatively towards the issues being discussed in the quotation. Thus, the result set returned to the user can rank the quotations by the sentiments included in them. In addition, a gradation regarding the level of positivity or negativity can also be indicated in the result set wherein the person issuing the quotation expresses a greatly positive or greatly negative sentiment or a neutral position towards the issue referred to in the quotation. Thereby, the quotations for a given person or topic can be ranked based on the sentiment expressed therein or the result set can be further refined based on the intensity of the sentiment expressed therein. In another embodiment the results presented to the user may also comprise a timeline that maps the quotations in the result set to their respective temporal attributes. Thus, the quote search engine facilitates users to search not only for quotations based on various criteria but also for information regarding quotations attributable to people.

Figure 2:
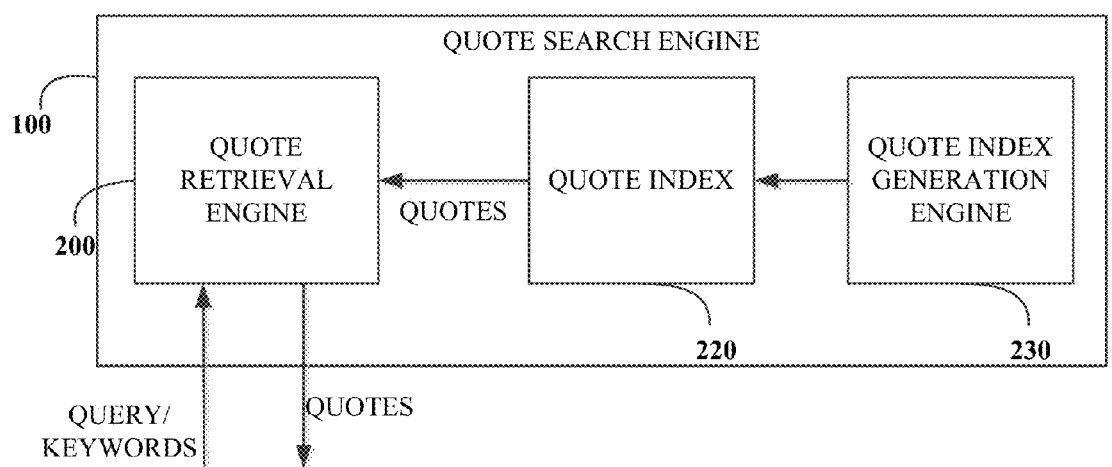
FIG. 2 is a block diagram of modules of the quote search engine in accordance with an embodiment of the present disclosure.

FIG. 2 is a block diagram that shows components of the quote search engine 100 in accordance with one embodiment. The quote search engine 100 comprises three components, the quote retrieval engine 210, a quote index 220 and a quote index generation engine 230. Although FIG. 2 depicts the quote search engine 100 as one component, it can be appreciated that this is not necessary and that the quote retrieval engine 210, the quote index 220 and quote index generation engine 230 can reside on different machines so that the quote search engine 100 comprises modules diffused across a network but which are communicatively coupled to each other. For example, the quote retrieval engine 210 can reside on the server 106 that communicates with user computers 102/104 while the quote index 220 and the quote index generation engine 230 reside on a backend server (not shown) which may not interface directly with user computers 102/104 but which is communicatively coupled to the server 106.

The quote retrieval engine 210 receives queries and/or keywords retrieved from the queries and further analyzes them to retrieve relevant quotes or relevant information regarding the quotes from the quote index 220. Free text queries received from users are parsed and analyzed using techniques such as natural language processing (NLP) to recognize keywords and the inter-relationships between them. The quote retrieval engine 210 employs the keywords and characteristics associated with the keywords from the user queries in order to retrieve appropriate results from the quote index 220.

The quote index 220 is a data structure stored in a computer readable storage medium that comprises the quotations and their respective attributes indexed with unique identifiers. Attributes such as the keywords included in the quotations, topics referred to or associated with the quotations, entities and other characterizing features associated with or included in the quotations attributable to people are all stored in the quote index 220. The quote index is created so that it can be efficiently searched by 'keyword', 'topic', 'quote by' (e.g., person who spoke or made the quote), or any of the other attributes of the quote. In accordance with different embodiments, all of these attributes can be used separately or in combination to quickly locate quotes. Therefore, the quote index can comprise combinations of the quotations, keywords or entities included in the quotations and metadata associated with the quotations. The metadata associated with the quotations, in one aspect, comprises characteristics such as a sentiment or intensity of the sentiment expressed in the quotes which are also indexed and stored in the quote index 220. Each of the attributes is indexed with a unique identifier for easy identification and retrieval. In this context, topic refers to a topic of a query, or keywords for example, "climate change" or "health care" or any noun included in the quotes while attributes of the quotes such as people making the quote, location, dates and other metadata associated with the quotations are referred to as entities. It may be appreciated that in an aspect, the keywords included in the queries can be one of the attributes of the quotations and hence can have a unique id in the quote index. For example, the quote index 220 can have a column for "quote by" or "quote holder" which lists names of people giving the quotes while another column for "quote about" can list the central issue of the quote which may be a topic/keyword from the quote such as music or climate change or which may also be another person. It can be appreciated that tabulating quotations in a quote index 220 facilitates easier look up of the quotations not only based on topics but also based on entities associated with them. For example, a user query can comprise the name of a person and since all the information associated with the quotes is stored in the quote index 220 and characterized by unique identifiers, quick look up of the quote index based on the entity of quote holder or "quote by" facilitates retrieval of all the quotes and related information.

The quote index 220 is built by the quote index generation engine 230 from a collection of articles that is dynamically updated as will be detailed further herein. Articles included in a data store are analyzed to recognize various attributes such as keywords, topics, the entities and the quotations made by people associated with such attributes. In addition, different metadata associated with each of the quotations is identified. A unique identifier is assigned to each of the recognized attributes. The attributes along with the quotations and the metadata of the quotations are indexed to form the quote index 220 which can be stored within a computer readable storage medium. The quote index 220 is coupled to the quote index generation engine 230 so that it can be updated regularly with new quotations, topics or even new attributes. Thus, the quote search engine 100 can provide a dynamic result set updated with the latest quotes to a user as opposed to providing a static result set comprising the same quotes that are retrieved for the same query even if it is executed at different times.

Figure 3:
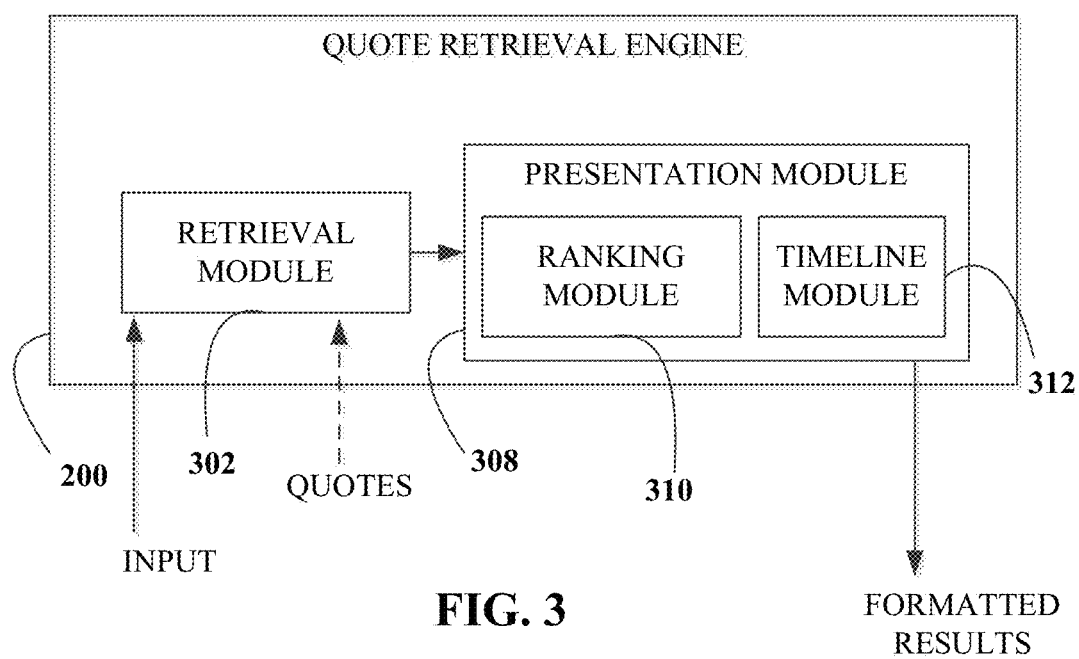
FIG. 3 is a block diagram showing the details of the quote retrieval engine in accordance with an embodiment of the present disclosure.

FIG. 3 is a block diagram showing the details of the quote retrieval engine 200 in accordance with one embodiment. The quote retrieval engine 200 can comprise a retrieval module 302 and a presentation module 308. The retrieval module 302 receives queries, keywords or other input supplied by the server 106. For example, if it is determined within the first step as discussed supra that the user is searching for quotations and/or information related to quotes, the retrieval module 302 can receive a user query as an input. Alternatively, if it is determined in a multi-step procedure that the user desires to retrieve quotations, the retrieval module 302 can receive the query as entered by the user, a query that has been reformulated or other input from the query analysis module 120 on the server 106. The received input analyzed by the retrieval module 302 to identify the topics associated with the quotes that the user desires to retrieve and a presentation format for the retrieved results. The retrieval module 302 also determines the entities to be retrieved from the quote index 220 in order to provide results that are responsive to the user query. For example, a user query can indicate that the user is searching for quotations by a person about a particular topic made during a particular year. The retrieval module 302 determines from the received input that quotations about the topic included in the query having attributes quote-by and date which match those in the query need to be retrieved. Accordingly, the retrieval module 302 accesses the quote index 220 to obtain results responsive to the received query. The retrieved quotations or results are passed on to the presentation module 308 by the retrieval module 302 for presentation in appropriate format to the user.

The presentation module 308 can process the results received from the retrieval module 302 for presentation to the user. It further comprises a ranking module 310 and a timeline module 312 for presenting results in an appropriate format to the user. In addition to receiving the retrieved results from the retrieval module 308, the presentation module 308 can additionally receive criteria that determine a presentation format for the results from the retrieval module 302. Based on the input from the retrieval module 302, the presentation module 304 can determine a ranking order for the results, calculate the number of quotes or entities in the results or determine other presentation criteria such as whether or not the user desires to see a timeline for the retrieved results. Accordingly, one or more of the ranking module 310 and the timeline module 312 can be employed to generate a result set for the user.

The ranking module 310 ranks retrieved quotations using a number of features including but not limited to their relevance to the query, most relevant people making quotes related to the query, the most relevant entities being talked about in the quotes related to the query, the number of articles that mention the same quote, and the query terms contained in the quote. Relevance of particular people for particular topics can be determined by employing statistical methods as will be further detailed infra. In addition, the ranking module 310 can rank results based on sentiments expressed in the quotations and the level or strength of the sentiment expressed in the quotations. For example, the ranking module 310 can provide a result set with quotations from different people regarding a particular topic ranked from a most positive to the most negative or vice versa. The ranking module 310 can also trim the result set to suit the users' stipulations. For example, based on the users' needs, only the top N number of quotations or other results can be returned to the user. The ranking module 310 will suppress the lower ranked results so that they do not appear in the result set returned to the user.

Alternate embodiments can also be contemplated such that in addition to providing a ranked list of quotations, the ranking module 310 can rank entities, such as, providing a list of topics which are currently being discussed, or the quote holder who is currently popular, or who is making quotes, or time periods during which quotes are made by a particular person, or about particular topics. In an embodiment, these ranked entities can be provided as suggestions to the user for further searches along with the result set. Thus, the quote search engine 100 can provide a user searching for quotes about a topic with other topics that are being discussed or other related people who are making quotes on keywords searched by the user. Thus, the quote search engine 100 facilitates users to determine which people most commonly talk about a particular topic, which entities a person most commonly talks about, the entities that are most commonly talked about in general or for a given topic or even topics/people who are most controversial. The later can be determined based on the sentiment entity and the intensity ratings associated with the retrieved quotations. For example, the intensity of a quotation can be represented as a graphic with the level of the bar graph being proportional to the level of intensity in the quotation.

The timeline module 312 included in the presentation module 308 produces a timeline that maps the generated quotes with their associated temporal entities. Accordingly, the times at which a specific person issued quotations on one or more topics or a timeline for a topic which maps the times at which different people gave quotes can be generated. In addition, the generated timeline can be dynamically modified by the user. For example, if a timeline is shown that maps quotes that are given by a person on a topic, it can be modified by mapping another topic for which the person has given quotes on the same timeline. It may be appreciated herein that while output from the ranking module 310 and timeline module 312 can be produced simultaneously, output from one of the modules can be suppressed based on user preferences to generate results in accordance with one or another format. In accordance with some embodiments, known software for plotting graphs such as FLOT sponsored by IOLA, INFOVIS, Simile Timeline SIMILE TIMELINE can be used for creating different timeline plots.

Figure 4:
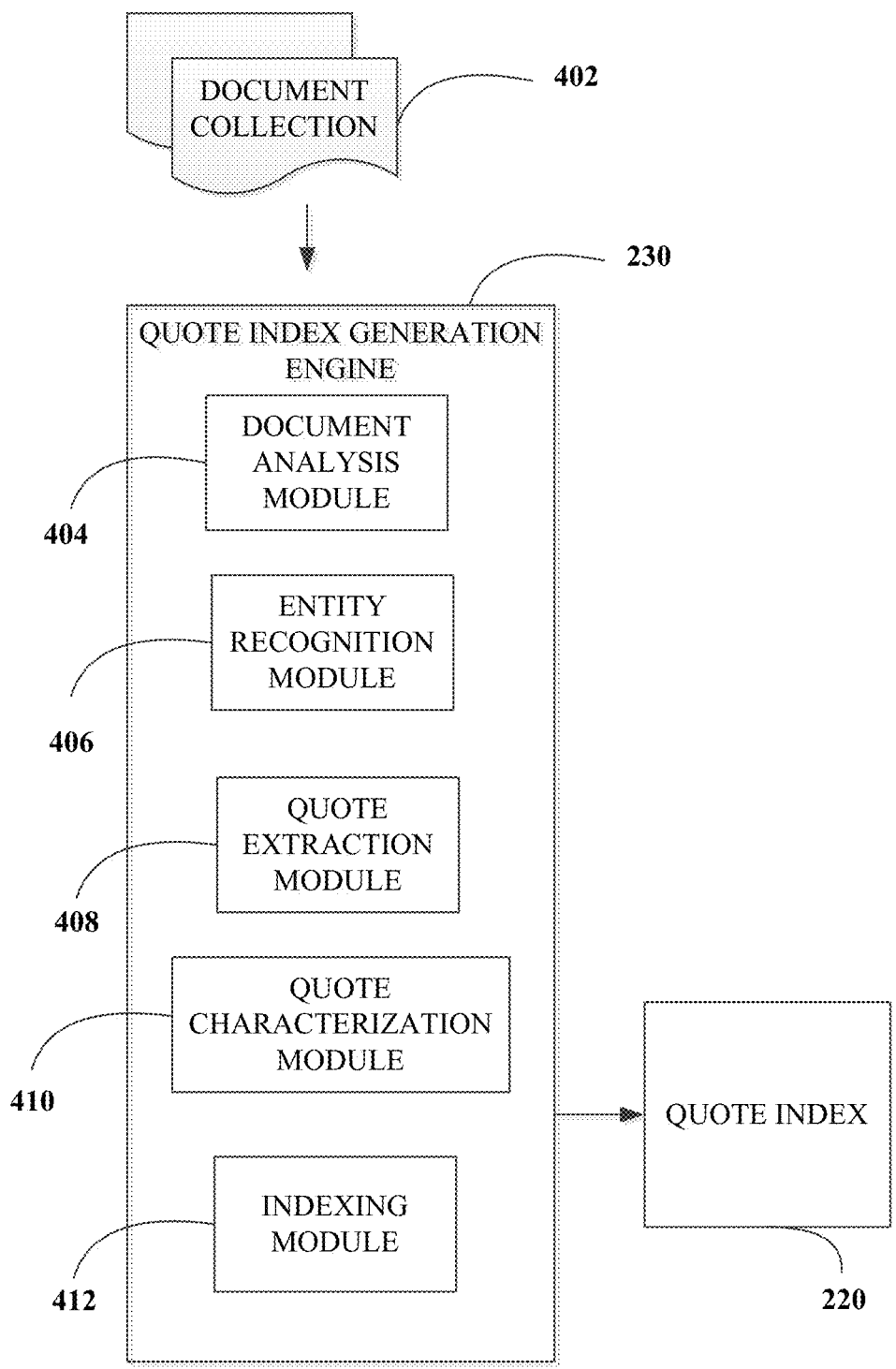
FIG. 4 is a block diagram that illustrates the modules of the query index generation engine in accordance with an embodiment of the present disclosure.

FIG. 4 is a block diagram that depicts the modules of the quote index generation engine 230 that automatically builds the query index 220. In an embodiment a combination of statistical and rules based methods are used identify the persons, locations, organizations, and temporal entities in each article. The entities are linked to an ontology that provides a unique id for each entity. Accordingly, the query index generation engine 230 is linked to a collection of documents 402 such as a data store comprised within a computer readable medium or an online source accessible via the Internet which is regularly updated with the latest news or combinations thereof. A large number of documents can be accessed and analyzed by the document analysis module 404 comprised within the query index generation engine 230. The number of documents processed can be scaled as high as necessary via addition of extra servers to handle the processing load. The document analysis module 404 can employ techniques such as natural language processing for the analysis of documents. The text of the documents is parsed and text processing tasks such as tokenization, sentence splitting, part-of-speech tagging and chunking are executed by the document analysis module 404. A continuous stream of text can be initially separated into tokens that include words, phrases or even punctuation marks. In addition, further analysis of the tokens such as parts of speech tagging, can facilitate recognition of quotations included in the text. The series of tokens can also be employed to determine sentence boundaries. Based on their definition and the context of usage, the tokens are further tagged with the appropriate parts of speech and can be classified in order to facilitate analysis such as entity recognition. In one embodiment, software such as OPENNLP from Apache Software Foundation can be used for tokenization, sentence splitting, part-of-speech tagging and chunking.

The data obtained by the document analysis module 404 such as the tokens with their parts of speech tags and which are classified in different groups based on their parts of speech or other characteristics is accessed by the entity recognition module 406. For example, readily available software such as SUPERSENSE TAGGER can be used for name-entity recognition. The entity recognition module 406 identifies attributes of the quotes such as the keywords, the topics and entities from the data obtained by the document analysis module 404 and links them to an ontology that provides a unique identification to each of the attributes. Tokens classified into different groups such as nouns comprising names of persons, places, organizations, units indicating quantities of matter and time etc., are all identified as the entities that facilitate retrieval of relevant quotes.

A quote extraction module 408 employs the tokens to identify and extract quotations from the documents. As discussed supra, the tokens are classified into groups based on their parts of speech metadata. The recognition or classification of punctuation marks such as marks that indicate open and closed quotes can facilitate recognizing text in documents as quotations given by people. In addition, the parts of speech metadata of the tokens and their context of usage in the text can facilitate recognition of quotations from the text which are formatted as reported speech. Thus, the quote extraction module 408 can extract quotations that comprise a single or multiple sentences from the text of the documents. In further embodiments, the quotation extraction module 408 can also employ metadata such as nature of the document or the article to determine if the article comprises quotations. For example, articles such as an op-ed column or a poem can be considered as a series of quotations or a single quote made by the writer.

The extracted quotes are further characterized by the quote characterization module 410 which determines various features of the extracted quotes. For example, a quote holder who made the quote, the dates and location associated with the quote, the source of the quote and other features related to the quotes which may or may not have been explicitly included in the quotes can be derived from the document collection 404 by the quote characterization module 410. In one embodiment, the quote characterization module 404 can employ machine learning methods to determine the sentiments expressed in quotes. This facilitates identifying whether the quote is positive or negative and also the level of intensity of the quote from low to extreme. Therefore, the sentiments associated with a quotations are also used to respond to user queries that request for quotations with certain sentiments towards certain topics or to rank quotations based on a range of sentiments they express towards a topic. The quote characterization module 410 also facilitates identifying people who express extreme sentiments or controversial topics that provoke people to express extreme sentiments. In one aspect, classifiers can be trained on a set of data such as documents or quotations marked explicitly, for example, manually, as positive or negative based on the sentiments associated with each quote. Similarly the data can also be explicitly marked with the intensity of the sentiment in order to train the classifier. Subsequently, the trained classifier can be employed to identify the sentiments and the intensity of the sentiments of various documents/quotes. For example, in one embodiment, known software such as SENTIWORDNET can be used to identify words with positive or negative connotations in addition to recognizing the intensity of positivity or negativity associated with different words. Thus, the quote characterization module 410 can classify different quotes it receives based on the sentiments and the intensity of the sentiments expressed in the quotes. In a further embodiment TARSQI can be used for time expressions.

The data collected from and analyzed by the modules detailed infra is indexed and stored in a data structure, namely, the quote index 220 by the indexing module 412. A standard inverted index is created for the attributes such as the keywords, the topics and the entities recognized by the entity recognition module 406. The indexing module 412 stores each of the attributes with their unique ids along with other data such as the quote itself, quote holder, location, date of the quote, sentiments expressed in the quote and the intensity of sentiments in the quote. In one embodiment, a stand alone server software such as Solr can be used for indexing and searching. It can be appreciated that the list of entities given herein is not exhaustive and is included by the way of illustration and not limitation. Moreover, building the quote index 220 is a dynamic process wherein the quote index 220 can be updated with new entities or quote characteristics even as they are identified from the document collection 402 by the various modules.

Figure 5:
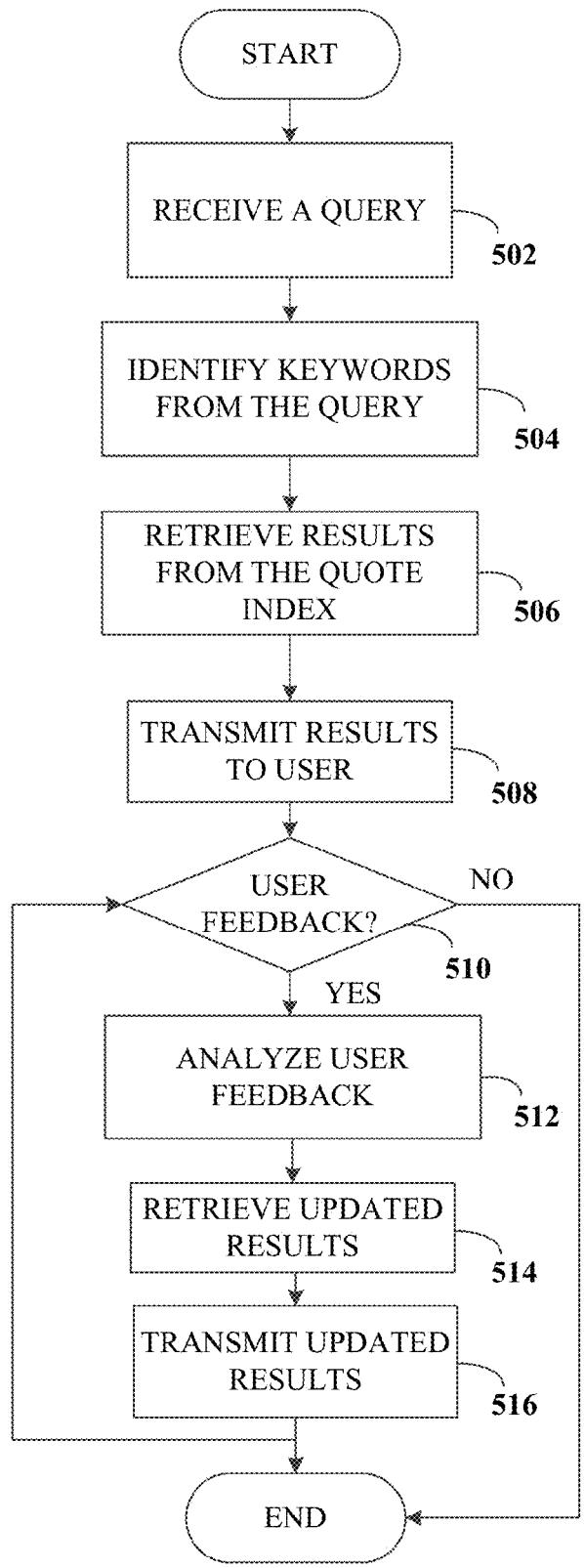
FIG. 5 is a flowchart illustrating an embodiment of the steps performed by a server computer to provide quotes in accordance with an embodiment of the present disclosure.

FIG. 5 shows a flowchart illustrating an embodiment of the steps performed by a server computer 106 in order to provide quotations in response to a user query. The procedure commences at step 502 with the server receiving a user query for quotes or information associated with quotes attributable to people. The query is analyzed to extract the keywords as shown at 504. Based on the extracted keywords, the server 106 determines that the user is searching for quotes from people or information regarding such quotes. Accordingly, the results relevant to the user query are retrieved from the quote index 220 by the server 106 as shown at step 506. The quote index 220 can be a component stored in a computer readable medium either on the server 106 or a disparate machine which is communicatively coupled to the server 106 receiving the user query. In one aspect, the results that can include quotations, metadata associated with quotations or combinations thereof can be retrieved based on matching the received keyword to the indexed terms or keywords stored in the quote index 220. The results retrieved at step 506 as being relevant to the query can include quotes retrieved from the quote index 220 in one aspect.

In accordance with further aspects, the quotes can either comprise the keywords in the query or they can have the keywords as one of the associated attributes or characteristics listed in the quote index 220. For example, in accordance with one aspect, the input received in the query can match one of the respective attributes e.g., 'quote by' or 'topics' or 'keywords' of different quotations and all the quotes associated with such matching attributes are retrieved as being relevant to the user query. In addition to the quotes, the quote search engine 100 can be used to obtain other such information related to the quotations in different formats. By the way of illustration and not limitation, the information obtained from the quote search engine 100 can include persons most relevant to a given topic, the topics about which a person issues quotations and the number of quotations issued on each topic by the person, a mapping that shows quotations associated with a topic to the times at which they are issued, or entities referenced in quotations and other combinations of information indexed in the quote index 220. At 508, the retrieved results are transmitted to the user in a predefined default format or in accordance with user preferences derived from the query. The server 106 is configured to receive and process further user feedback as shown at step 510. If there is no further user feedback, the process of providing relevant results terminates at the end block. However, if further user feedback is received at step 510, the feedback is analyzed as shown at step 512 to retrieve additional criteria for refining the results provided to the user. For example, various criteria such as a display format or an order for ranking the results may have been modified by the user. The user can also provide additional attributes such as a second entity in the feedback to update the result set received from the server 106. In the later case, the server 106 receiving the user feedback can automatically construct a new query and access the quote index 220 to retrieve the updated set as shown at 514. The updated quotes are transmitted to the user at step 516. Therefore, the process of providing relevant quotations to the user is an interactive procedure wherein user feedback can be collected and the result set provided to the user can be updated in real time.

Figure 6:
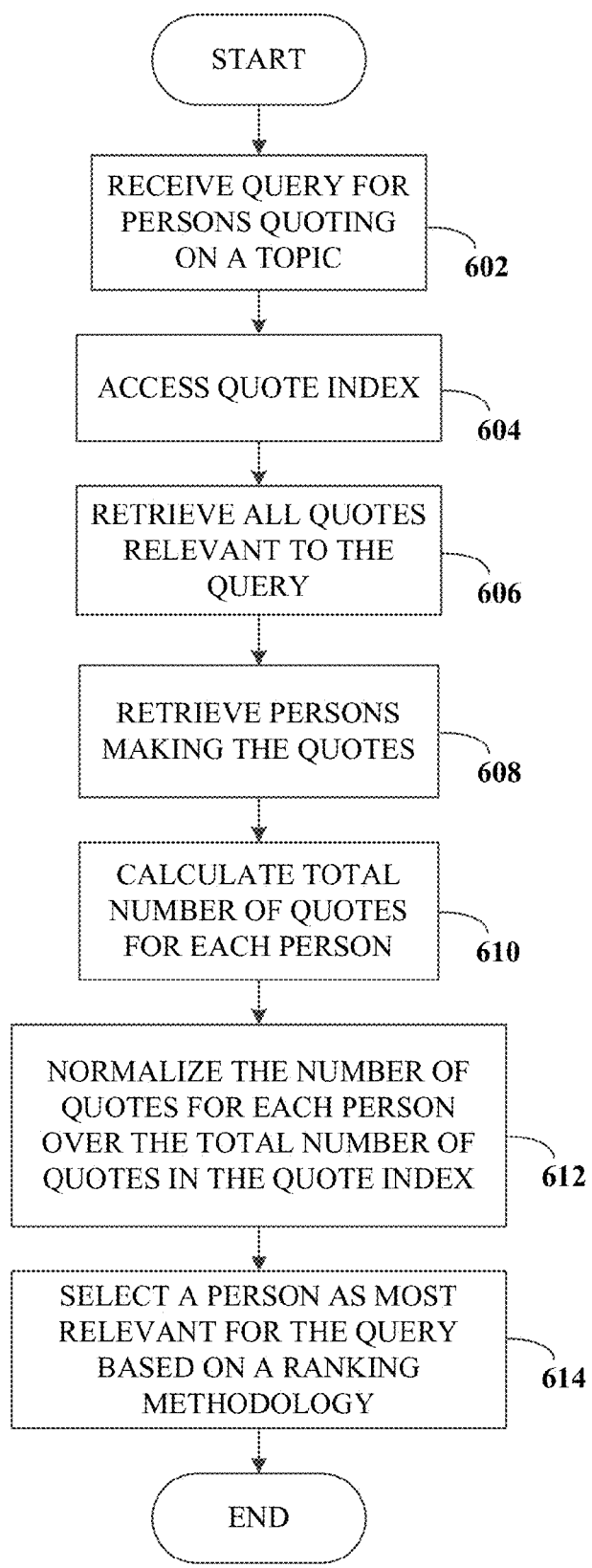
FIG. 6 is a flow chart that details the procedure of retrieving a person most relevant to a query in accordance with an embodiment of the present disclosure.

FIG. 6 is a flow chart detailing the process of obtaining a person issuing quotes most relevant to a topic by the quote search engine 100. At step 602, a user query is received for a person issuing most relevant quotes on a topic comprised within the query. The quote index 220 is accessed as shown at 604 and all quotes relevant to the topic are retrieved from the quote index as shown at 606. In addition, the persons making the quotes are also retrieved from the quote index 220 as shown at 608. The total number of quotes made by each person for the topic in the query is calculated as show at 610. The number of quotes made by each person for the topic is normalized over the total number of quotes included in the quote index as shown at 612. At step 614, a person can be identified as being most relevant to the topic in the query based on various ranking methodologies. For example, methods such as, but not limited to, tf-idf (term frequency-inverse document frequency) can be employed for the ranking. Thus, the quote search engine 100 can employ statistical techniques to address user queries.

Figure 7:
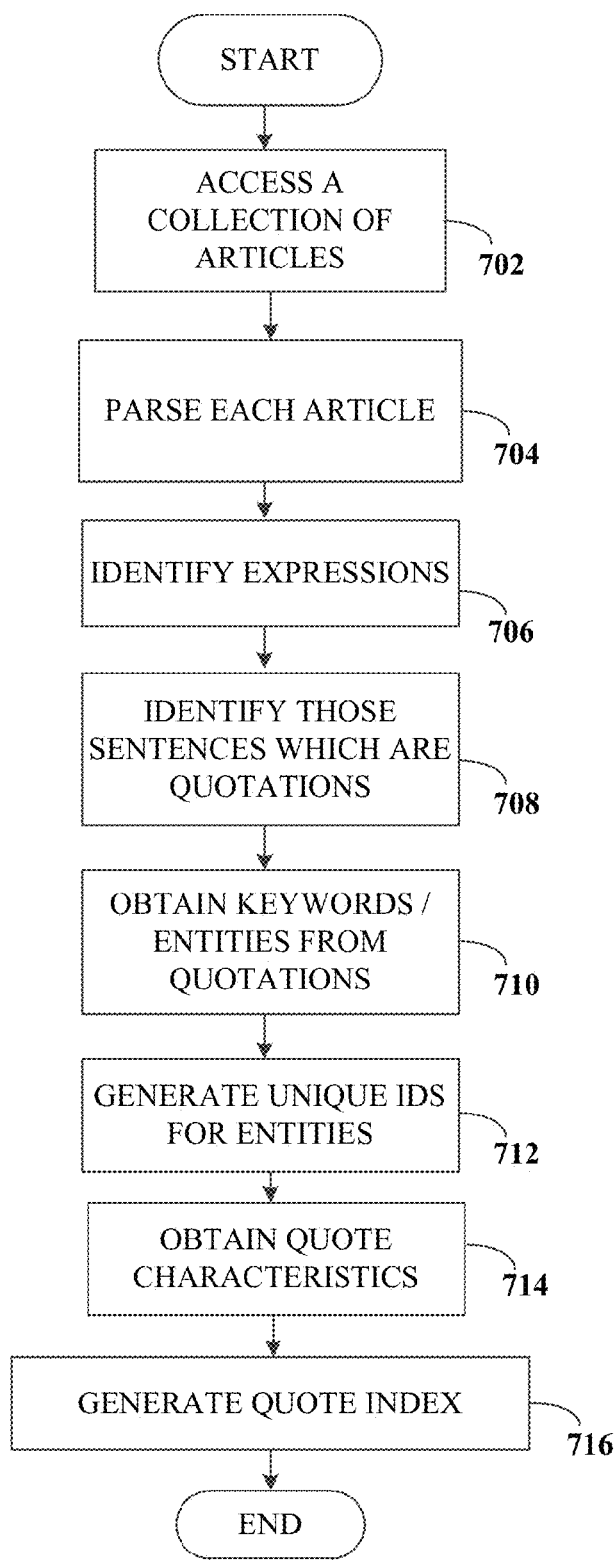
FIG. 7 is a flow chart illustrating the steps involved in generating the quote index in accordance with an embodiment of the present disclosure.

FIG. 7 is a flow chart detailing the steps involved in generating the quote index. Initially at step 702 a collection of articles or documents is accessed by a processor building or updating the quote index. In different embodiments, the collection of articles can be embodied in a computer readable storage medium connected directly to the processor or the articles can be obtained from sources available via networks, such as the Internet or combinations thereof so that quotations can be automatically obtained from the articles as they are posted on the websites. The articles are parsed and tokenized as shown at step 704. The tokens generated can comprise words, phrases, or punctuation marks. In addition, metadata associated with the words in the sentences, such as their parts of speech, context of usage or grammatical structure of the sentence is obtained. The tokens can also be used to separate sentences in the articles. For example, punctuation marks such as a period or stop words can be used to identify discrete sentences within the articles. Thus, expressions such as punctuation marks extracted from the articles are identified as shown at 706. At step 708, sentences within the articles which are quotations made by people are extracted. For example, punctuation such as quotation marks can indicate if a sentence is a quotation given by a person. In addition, words obtained from the articles, the context of their usage and metadata associated with the words in the sentences can all be used to identify those sentences which are quotations made by people. At step 710 the extracted quotations are further processed to identify attributes such as keywords, topics, entities and other characterizing features associated therewith. As described supra, the words and their metadata is used to identify the entities which are referred to in the quotations. By the way of illustration and not limitation, the entities can include nouns such as names of people, places, organizations, measures, topics and objects. Each of the identified attributes is assigned a unique identifier as shown at step 712. The identifiers are used to index the attributes and in retrieving quotes that match the keywords in received queries. The quotes are also further processed to identify their characteristics at step 714. By the way of illustration and not limitation, the characteristics identified for the quotes can include the quote holder or the person making the quote, the sentiment expressed in the quote, the intensity of the sentiment expressed in the quote, a location or event and a time/date associated with the quotation. In one embodiment, a forward index can be built initially to index the documents from the document collection to the entities listed therein. The forward index can be inverted to generate the quote index at step 716 as a standard inverted index wherein the unique identifiers map the entities to locations in the documents that comprise the entities therein. In addition, the quote index can store the quotation itself, the person who made the quote, the topic referred to in the quote, the sentiment of the quote, the intensity of the sentiment including all the other characteristics and entities obtained at steps 710 and 714.

Figure 8:
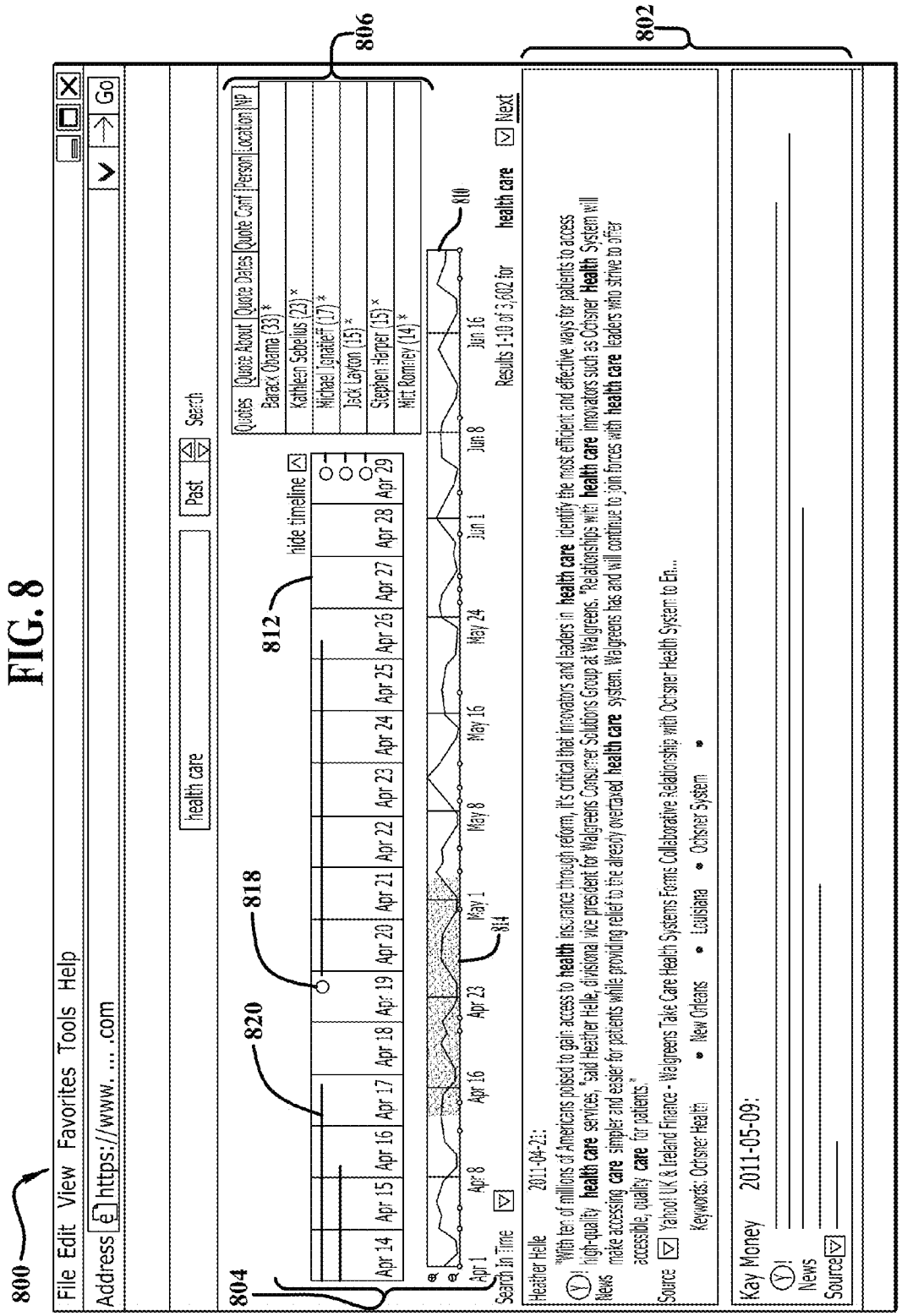
FIG. 8 is a depiction of an example of a web page showing relevant quotes and entities in accordance with an embodiment of the present disclosure.

Turning now to FIG. 8, an embodiment of a screen shot of a web page 800 is shown. The web page 800 is generated in response to a query for quotes relevant to healthcare given by different people. The webpage 800 has multiple sections 802, 804 and 806 which present different types of information associated with the topic "healthcare" obtained from the quote index 220. Although the webpage 800 shows all the sections simultaneously, it may be appreciated that more or less sections can be shown in accordance with different embodiments based on user selection of a section or criteria obtained from user query. The section 802 shows the quotes from different people associated with the topic "healthcare" ranked in accordance with their relevance and issued within a particular date range. The date range of the quotes can be seen in the section 804 which displays a timeline of the quotes split between two bands. The lower band 810 is referred to as a "trend graph" and shows how the frequency of documents containing the term "healthcare" changes over a month. The peaks in the graph indicate that a significant development occurred in the realm of healthcare during that time range. The details of the quotes issued in the shaded region 814 of the lower band 810 are shown in the upper band 812, which is referred to as the topic timeline. The topic timeline 812 displays details or metadata related to the quotes, e.g., the titles 820 (details not shown) of top articles from which quotes displayed in section 802 were extracted. The circles 818 indicate that the articles have quotations relevant to the user query which can be viewed upon selecting them. The section 806 shows a list of all the people making quotes about the topic "healthcare" ranked by the number of quotes made by each person.

FIG. 9a shows a detailed a screen shot of the section 806 generated in accordance with one embodiment. The section 806 includes a list of persons making quotes and the number of quotes made by each person. The quote holders in the list are ranked according to the relevance of quotations given by each person under the "Quote" tab. The user interface also includes other tabs such as "Quote About", "Quote Dates", "Location" etc. which, if selected by the user, show relevant data retrieved from the quote index 220 and formatted by the quote search engine 100. The tab "NP" shows various noun phrases associated with the quotes. In one embodiment it can include noun phrases such as topics or issues which are not explicitly referred to in the quotes but which may be implicitly associated with the quotes. In other embodiments such noun phrases can include the name of the person issuing the quote, the name of a person/place referred to in the quote or other common and proper nouns associated with the quotes. The tab "Quote Conf" indicates the confidence level associated with the quote, it can include the confidence that the quote is given by a certain person or that the quote is about the issues associated therewith. Although web page 800 shows all the tabs described herein, it can be appreciated that in various embodiments, one or more tabs may not be included. For example, the "Quote Conf" tab may only be used to test the system 100 and may not be generally included in the web page 800 when it is displayed to users.

Figure 9B:
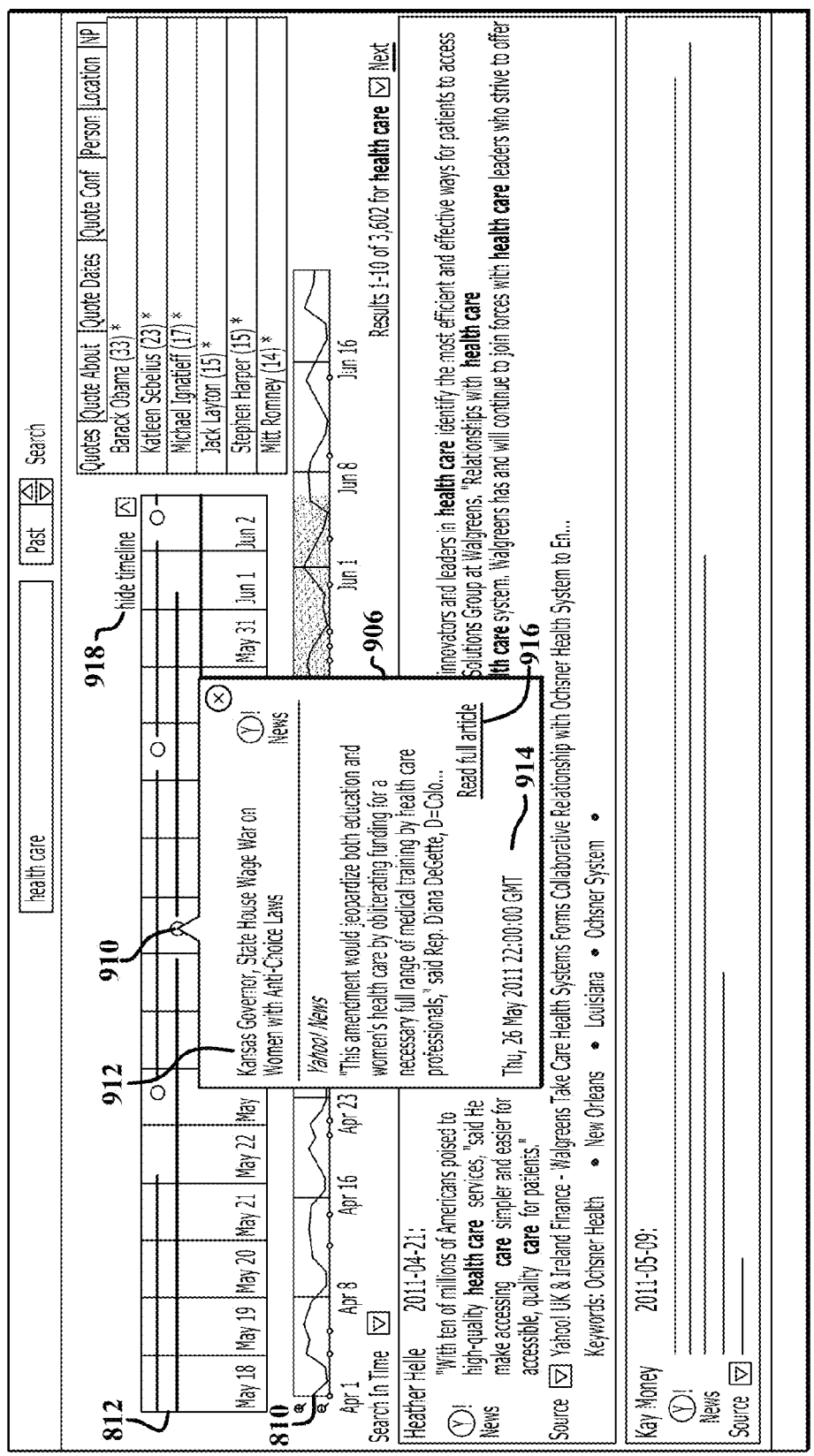
FIG. 9b is a depiction of examples of the timelines generated in accordance with embodiments of the present disclosure.

FIG. 9b shows the timelines generated for a query in accordance with one embodiment. As discussed supra, two timelines 810 and 812 are generated. The first timeline 812 shows the sources or articles from which the quotes are extracted, as selectable dots graphed against the dates on which the articles were published. When the user clicks on one of the dots 910 displayed on the graph, the quote extracted from the article is displayed in the callout 906. In addition to displaying metadata about the quote such as, the title of the article from which the quotation is obtained 912, a date associated with the quotation 914, a link to the full article 916 can also be provided in the callout 906. The link "hide timeline" 918 if selected by the user, will indicate to the quote search engine 100 that the user does not wish to display the timeline. Accordingly, output from the timeline module 312 will suppressed in the user display.

Figure 10A:
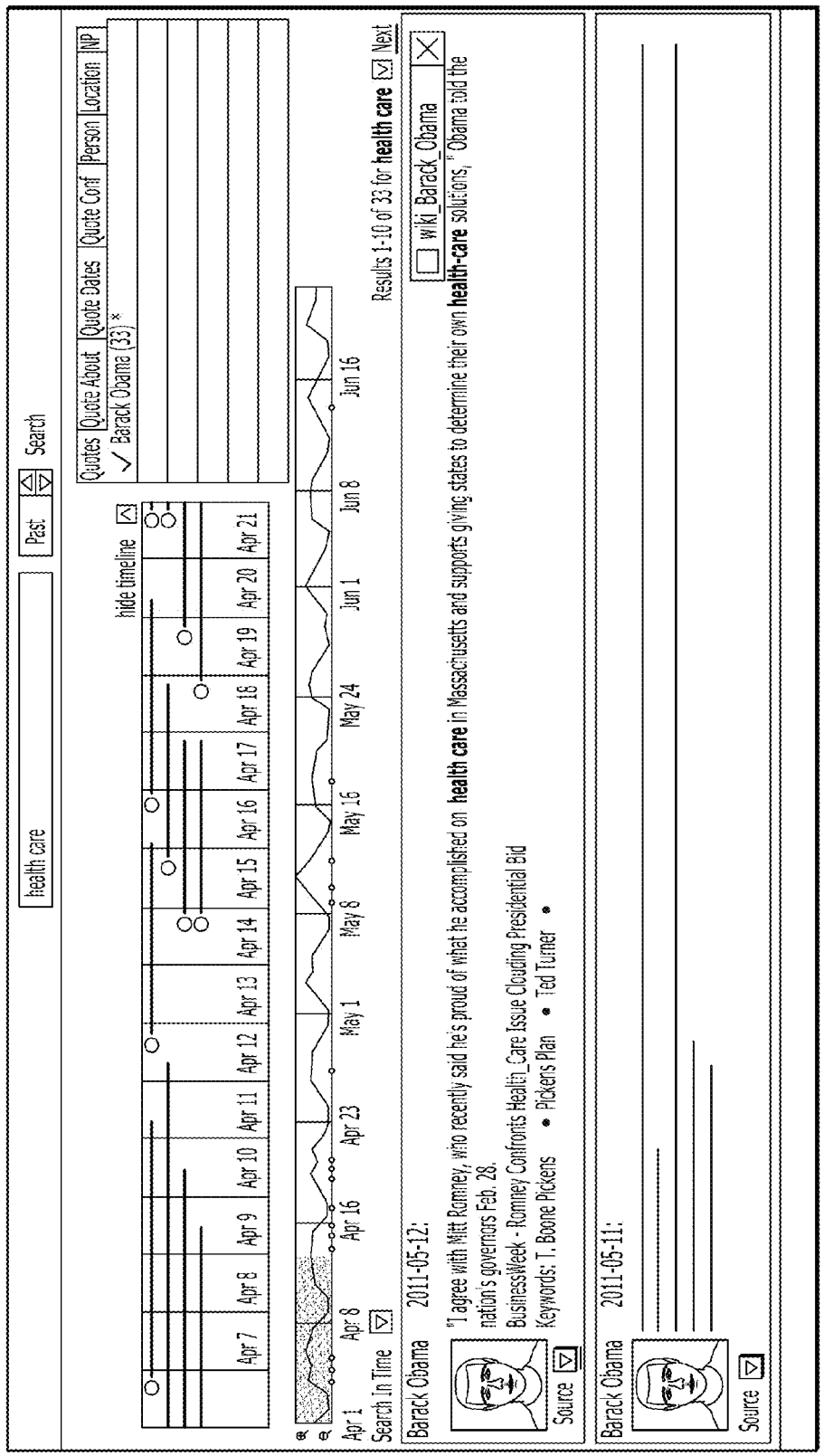
FIGS. 10a-c are webpage examples of the results generated for different queries in accordance with different embodiments of the present disclosure.
Figure 10B:
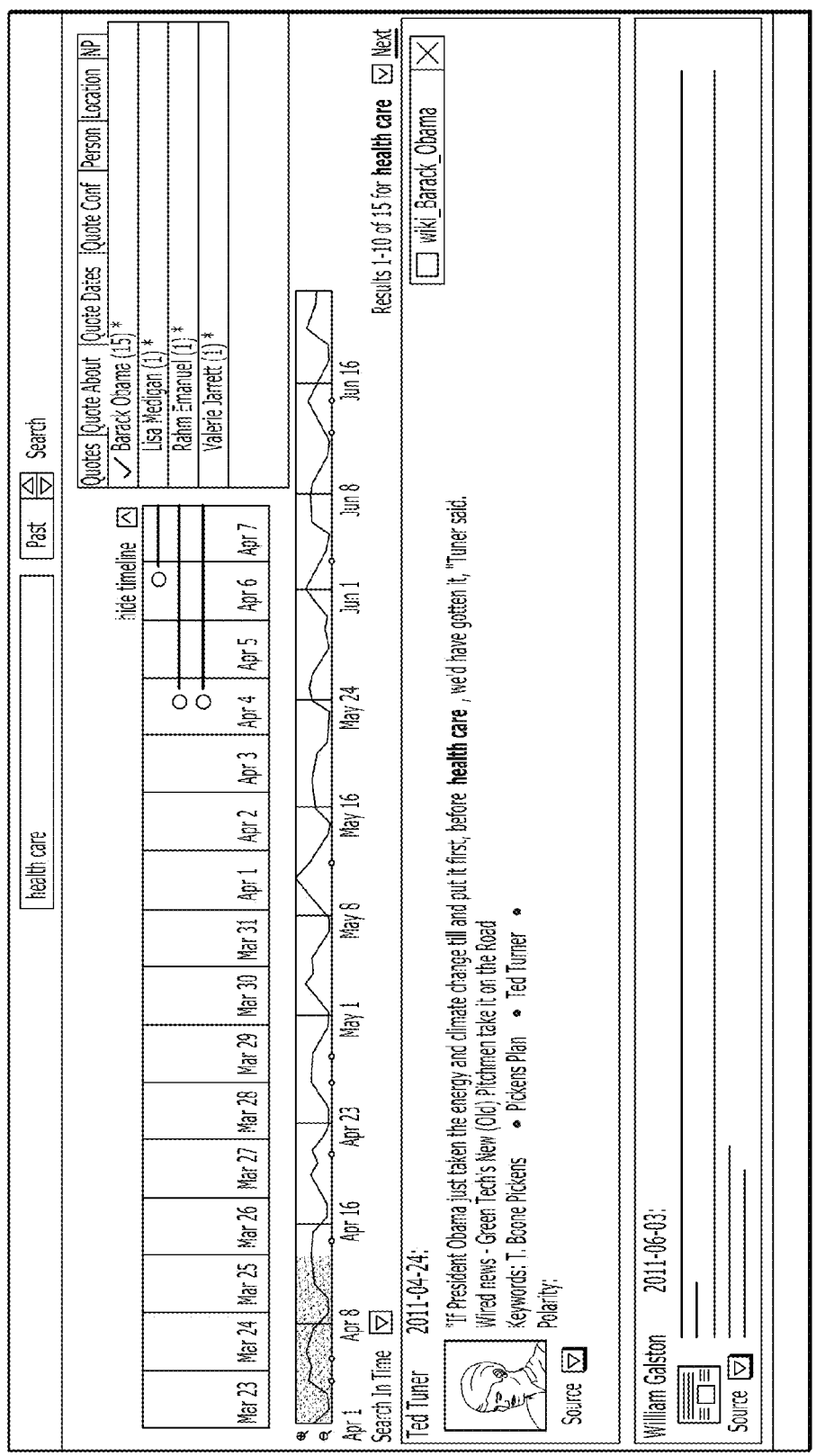
Figure 10C:
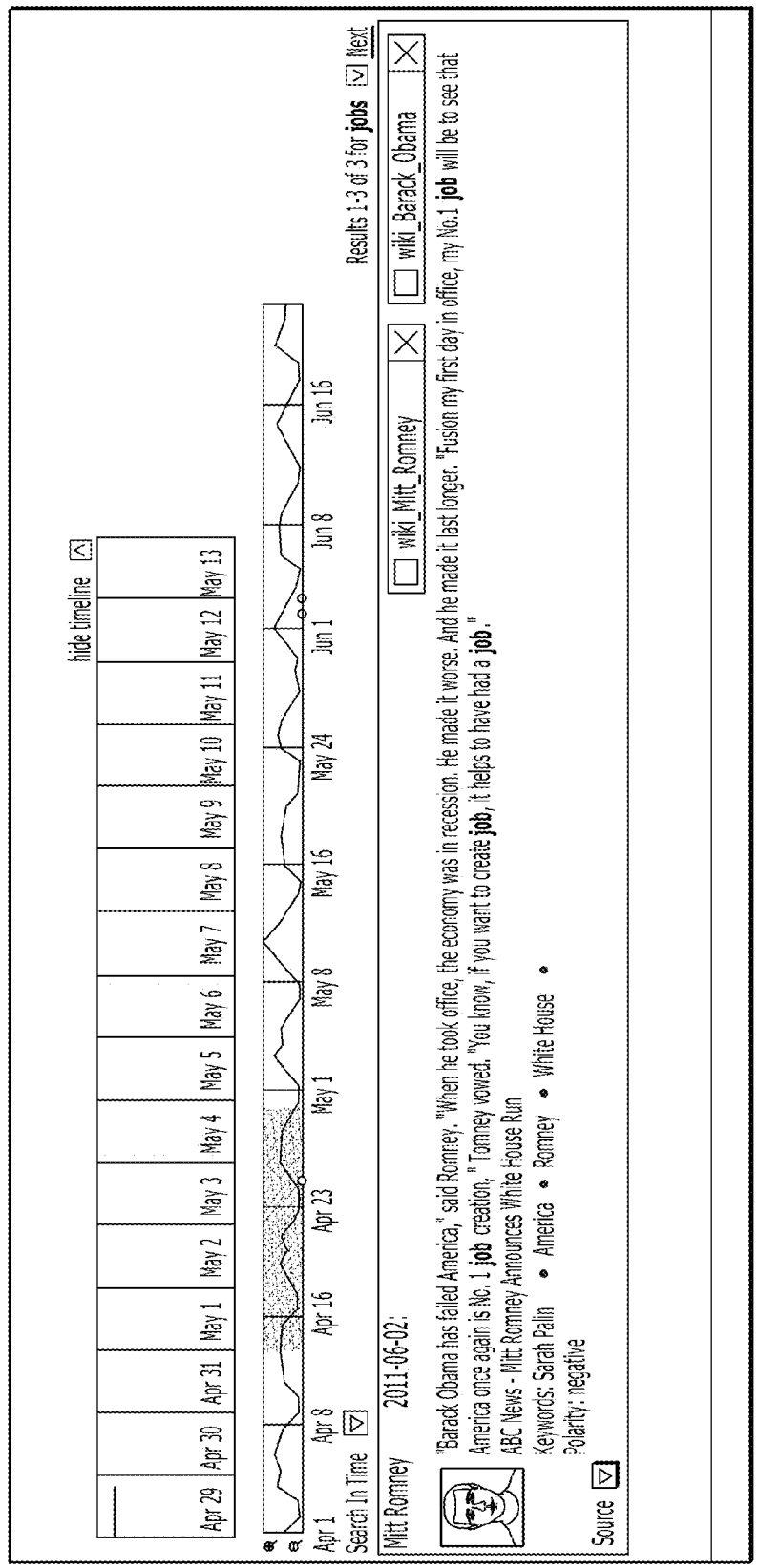

FIGS. 10a-c are webpage examples of results generated for different queries. FIG. 10a shows the quotations by President Obama on the topic of healthcare. The figure shows a partial list of two quotes from among the thirty three quotes that were retrieved in response to a search for quotes by President Obama on the topic of healthcare.

FIG. 10b shows quotations about President Obama's healthcare policy by other people. Only a partial list of two quotations are shown in the figure from the fifteen results retrieved in response to the query. Additionally, a list of other people such as Lisa Medigan etc., on whom quotations were issued in association with the topic "healthcare" are also shown. A timeline showing related dates of the quotations is also generated along with the results.

FIG. 10c shows the results retrieved in response to a query that involves two entities about a topic. The results shown are quotes by Mitt Romney about President Obama related to the issue of jobs. Again the figure shows the first quotation from a set of three quotations made by Mitt Romney about jobs and President Obama that were retrieved in response to the query. A timeline showing related dates of the quotations is also generated along with the results.

FIG. 11 is a block diagram illustrating an internal architecture of an example of a computing device, such as server computer 110 and/or user computer 105, in accordance with one or more embodiments of the present disclosure. A computer as referred to herein refers to any device with a processor capable of executing logic or coded instructions, and could be a server, personal computer, set top box, smart phone, pad computer or media device, to name a few such devices. As shown in the example of FIG. 11, internal architecture 1100 includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108 as an interface for a drive that can read and/or write to media including removable media such as floppy, CD-ROM, DVD, etc. media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code, and/or computer-executable process steps, incorporating functionality described herein, e.g., one or more of process flows described herein. CPU 1112 first loads computer-executable process steps from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, playlists and other files. Persistent storage medium/media 1106 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method of providing quotes, comprising:
receiving, by a processor, a user query related to quotes attributable to people, the query comprising a keyword;
identifying, by the processor, the keyword within the query;
accessing, by the processor, a quote index comprising indexed quotes attributable to people, the quote index also comprising a unique identifier for an attribute matching the identified keyword;
retrieving, by the processor from the quote index, results responsive to the query, the results comprising a plurality of quotes, the plurality of quotes include quotes that comprise the at least one keyword and quotes that have the at least one keyword as a respective attribute in the quote index;
generating, by the processor, a timeline for the plurality of quotes, the timeline maps indications of respective sources of the quotes to respective times of publication of the sources, the timeline is further configured to display one of the quotes in response to user selection of the indication corresponding to the respective source; and
transmitting, by the processor to the user, the retrieved results.

2. The method of claim 1, wherein retrieving the results responsive to the query further comprises:
retrieving, by the processor, attributes of quotes relevant to the keyword, each attribute is comprised within the quote index along with a respective unique identifier associated therewith.

3. The method of claim 1, further comprising:
receiving, by the processor, user feedback associated with the transmitted results; and
identifying from the user feedback, by the processor, at least a second attribute.

4. The method of claim 3, further comprising:
updating, by the processor, the results transmitted to the user based at least on the second attribute; and
transmitting, by the processor, an updated set of results to the user.

5. The method of claim 1, further comprising:
receiving, by the processor, a further user input associated with the generated timeline; and
updating, by the processor, the timeline based on the further user input.

6. The method of claim 1, further comprising:
generating, by the processor, the quote index from a data store comprising articles that include the quotes attributable to people.

7. The method of claim 6, further comprising:
parsing, by the processor, the articles to generate tokens;
identifying, by the processor, tokens that indicate discrete sentences.

8. The method of claim 7, further comprising:
identifying, by the processor, the sentences included within the articles that are quotes made by people based on the generated tokens;
extracting, by the processor, attributes associated with the identified quotes; and
assigning, by the processor, unique identifiers for each of the extracted attributes.

9. The method of claim 8, further comprising:
identifying, by the processor, sentiments expressed in the quotes;
identifying, by the processor, a respective level of sentiments expressed in the quotes; and
storing, by the processor in the quote index, the identified sentiments and the levels of sentiments.

10. The method of claim 6, further comprising,
storing in the quote index, by the processor, at least the unique ids and the extracted attributes.

11. The method of claim 10, wherein the extracted attributes comprise the keywords included in the quotes, topic of the quotes and entities associated with the quotes including a person who gave the quote, a time at which the quote was made, a location at which the quote was made, an event at which the quote was made, a topic of the quote, a person referred to in the quote and a place referred to in the quote.

12. A computer-readable storage medium tangibly storing thereon computer program instructions capable of being executed by a computer processor, the computer program instructions defining the steps of:

receiving, by a processor, a user query related to quotes attributable to people, the query comprising a keyword;

identifying, by the processor, the keyword within the query;

accessing, by the processor, a quote index comprising indexed quotes attributable to people, the quote index also comprising a unique id for the identified keyword;

retrieving, by the processor from the quote index, results responsive to the query, the results comprising a plurality of quotes that comprise quotes including the at least one keyword and quotes that have the at least one keyword as a respective attribute in the quote index;

generating, by the processor, a timeline for the plurality of quotes, the timeline maps indications of respective sources of the quotes to respective times of publication of the sources, the timeline further configured to display one of the quotes in response to user selection of the indication corresponding to the respective source; and transmitting, by the processor to the user, the retrieved results.

13. A computing device, comprising:

a processor;

a storage medium for tangibly storing thereon modules for execution by the processor, the modules comprising:

a query input module that receives the user query comprising at least one keyword;

a query analysis module that analyzes the user query, extracts the at least one keyword from the user query;

a quote search engine that generates results responsive to the user query from a quote index based on the at least one keyword, the quote index comprising indexed quotes attributable to people, the quote index also comprising unique identifiers for attributes of the quotes that match at least one keyword identified from the user query, wherein the results comprise a plurality of quotes comprising quotes including the at least one keyword and quotes that have the at least one keyword as a respective attribute in the quote index;

a timeline module that generates a timeline for the plurality of quotes, the timeline maps indications of respective sources of the quotes to respective times of publication of the sources, the timeline further configured to display one of the quotes in response to user selection of the indication corresponding to the respective source; and a presentation module for displaying the generated results on a display of a computing device.

14. The computing device of claim 13, the quote index comprises attributes associated with the quotes.

15. The computing device of claim 13, the quote search engine comprises a retrieval module that analyzes the at least one keyword to determine attributes associated with quotes that match the user query.

16. The computing device of claim 13, the presentation module determines a presentation format for the generated results and formats the results for display to a user.

17. The computing device of claim 13, the presentation module comprises:

a ranking module that ranks the generated results.

18. The computing device of claim 13, further comprising the quote index.

19. The computing device of claim 13, further comprising a quote index generation engine that builds the quote index from a collection of articles.

20. The computing device of claim 19, further comprising a document analysis module that parses documents within the collection and generates tokens.

21. The computing device of claim 20, further comprising an entity recognition module that identifies attributes from the generated tokens and provides the unique identifiers for each of the identified attributes.

22. The computing device of 21, further comprising an indexing module that builds the quote index by storing the keywords and the unique identifiers in the quote index.

23. The computing device of claim 22, the quote characterization module further identifying an intensity of sentiment expressed in the quotes.

24. The computing device of claim 19, further comprising a quote extraction module that extracts the quotes from the articles.

25. The computing device of claim 19, further comprising a quote characterization module that characterizes the quotes as positive, negative or neutral based on sentiments expressed regarding respective topics or entities associated with the quotes.

* * * * *